US008233751B2

(12) United States Patent
Patel et al.

(10) Patent No.: US 8,233,751 B2
(45) Date of Patent: Jul. 31, 2012

(54) METHOD AND SYSTEM FOR SIMPLIFIED RECORDKEEPING INCLUDING TRANSCRIPTION AND VOTING BASED VERIFICATION

(76) Inventors: Nilesh V. Patel, Novi, MI (US); Mark H. Schwartz, Livonia, MI (US)

( * ) Notice: Subject to any disclaimer, the term of this patent is extended or adjusted under 35 U.S.C. 154(b) by 1484 days.

(21) Appl. No.: 11/507,061

(22) Filed: Aug. 18, 2006

(65) Prior Publication Data
US 2007/0237427 A1 Oct. 11, 2007

Related U.S. Application Data

(60) Provisional application No. 60/790,762, filed on Apr. 10, 2006.

(51) Int. Cl.
*G06K 9/54* (2006.01)
(52) U.S. Cl. ........ 382/306; 382/100; 382/321; 358/505; 709/202; 709/225; 714/4.1
(58) Field of Classification Search .......................... None
See application file for complete search history.

(56) References Cited

U.S. PATENT DOCUMENTS

| | | | |
|---|---|---|---|
| 6,906,817 B1 * | 6/2005 | Berard et al. ................. | 358/1.15 |
| 6,917,438 B1 * | 7/2005 | Yoda et al. .................... | 358/1.15 |
| 2002/0084325 A1 * | 7/2002 | Reardon ........................ | 235/386 |
| 2003/0202690 A1 * | 10/2003 | Jones et al. .................... | 382/139 |
| 2005/0030579 A1 * | 2/2005 | Tohyama ....................... | 358/1.15 |
| 2005/0111722 A1 * | 5/2005 | Gerwin ......................... | 382/132 |
| 2006/0053097 A1 * | 3/2006 | King et al. ........................ | 707/3 |

FOREIGN PATENT DOCUMENTS
EP 616296 A2 * 9/1994
\* cited by examiner

*Primary Examiner* — John Lee
(74) *Attorney, Agent, or Firm* — Harness, Dickey & Pierce, PLC

(57) ABSTRACT

A simplified method of recordkeeping is provided. The method includes capturing a document image of a transaction document; identifying a document type of the transaction document; associating the document image with a data capture template based on the document type; transmitting the document image and the data capture template to a remote system; extracting record data from the document image based on the document type; and populating the data capture template with the record data.

14 Claims, 13 Drawing Sheets

METHOD AND SYSTEM FOR SIMPLIFIED RECORDKEEPING INCLUDING TRANSCRIPTION AND VOTING BASED VERIFICATION

CROSS-REFERENCE TO RELATED APPLICATIONS

This application claims the benefit of U.S. Provisional Application No. 60/790,762, filed on Apr. 26, 2006. The disclosure of the above application is incorporated herein by reference.

FIELD

This disclosure relates to systems and methods for facilitating management of paper or electronically based documents by using computers to scan, recognize, classify, and store the electronic images and then transmit the digital data electronically to remote transcription and verification facilities for backup of valuable data and for completely accurate entry into recordkeeping systems.

BACKGROUND

The statements in this section merely provide background information related to the present disclosure and may not constitute prior art.

Need for Digital Storage of Documents

The reliability of scanning and image capture hardware and software makes it possible to store digital copies of documents. Advances in optical character recognition (OCR) software make it further possible to perform fairly reliable conversion of machine generated text into digital format especially when reading a form of fixed and known type.

Computerization has improved the productivity of most areas of business. However the promise of the paperless office has yet to become ubiquitous. In reality, it is still a manual and tedious process to perform all the handling necessary to compile numerous paper based documents and receipts in order to itemize expenditures for either an individual or a business enterprise.

Weakness in Prior Art Processing of Accounting Documents

Despite these technological advances in document scanning, and digital image storage and retrieval, several critical weaknesses remain in bookkeeping and also for example processing of expenditures for accounting. One of those weaknesses is the massive disparate types of receipts which prevent software from handling the receipt as a known form type. Also, these documents vary greatly in size, shape, and print quality. These factors have led some inventors to try to surmount the problem by improving the capability of software in terms of handling more fonts or of better removal of background noise. Another approach has been to avoid the dependence on machine character recognition by generating a more easily machine readable barcode summary of the receipt information when printing each such receipt. But, in lieu of the widespread adoption of this last solution, it is necessary to come up with a more reliable method for content recognition of, and information capture from, financial documents.

Because tax requirements are dictated by law, any technological efforts to minimize the time required to comply must adhere to strict guidelines. Furthermore, companies have invested huge sums of time and capital to develop their existing tax compliance systems, and a redesign of those systems would be difficult to coordinate and costly to implement. Thus, any solution must work well with existing, and disparate, accounting systems and networks.

Document Transcription

Improvements in document data entry and transcription services are attributable to advances in optical character recognition techniques and improved forms, but also due to increases in use of digital recording, and in the power of personal computing software. Originally, transcription services consisted of a secretary taking dictation in shorthand. Later, the secretary would type from the handwritten notes. With improvements in recording machines, managers could make recordings by themselves without their assistants present. Then, the recordings could be transferred to the playback machine for transcription by the secretaries. Nowadays, recording devices can record an audio file directly into digital format which can be wired over the internet to any location for transcription. This has made services feasible to most economically transcribe for example medical records as dictated by a physician. The resulting report is sent back in printed fashion for quick review by the physician. This process ensures high accuracy.

Transcription of financial information relies on the ever improving accuracy of optical character recognition. For highest accuracy the OCR output can be verified by a human operator. This process can work with very high accuracy but typically this approach is used in situations where the forms are fixed and operators are well trained and versed in the specific form types. This process is not typically used in situations where the forms are varied and unknown to the OCR software. In these cases, the accuracy of the system would be severely degraded. In addition to transcription of printed documents, advanced recorded voice services have been established to automate audio transcription processes and allow remote workers to process digital audio files of recorded speech.

Prior Art in Financial Bookkeeping

Bookkeeping, an exemplary form of recordkeeping, generally requires bookkeeping personnel to perform recognition of various financial documents, decision as to what type of action is required, extraction of the pertinent information and entry into a database for later action. Bookkeepers generally receive a stack of accounting documents that they sort into proper categories such as invoices, receipts, and purchase orders. Depending on the type of document, the bookkeepers extract the key information and enter it into an accounting server, and then file the sorted paper documents.

FIG. 1 illustrates a functional overview of the processing procedures that may be involved in the collection of recordkeeping information for business operations 300. In particular, the extraction and file document steps are manual and time consuming processes that suffer because of their tedious and repetitive nature. Once the bookkeeper 5 enters the key information into accounting server 34, the accounting database 26 contains the information that the accountant 4 can query to extract the data necessary to comply with reporting requirements. Also as illustrated in FIG. 1, the accountant generates tax documents 16 for submission to tax authorities 8.

FIG. 2 illustrates a functional overview of the processing procedures that are typically involved in the setup of recordkeeping processes for business operations 400. As shown, tax authorities 8 create tax laws 17 which are studied by the corporate accountant 4. Based on their professional expertise which imparts them the ability to decide how best to apply tax requirements to a particular company, the accountant 4 creates accounting procedures and these are implemented in the structure of the accounting database 26 located on the accounting server 34. The accountant 4 also creates the chart of accounts 18 which will be used by the bookkeeper 5 to setup the company document files 14 and by the user 2 or company employees when they need to classify or file a document or just understand corporate policy regarding various financial transactions.

Portable Scanners

A very large number of products are now available to portably scan documents. The attempt is to make the document scanner most easy to access and least obtrusive when used in concert with the personal computer. For example, there are several scanning devices that are built right into the computer keyboard. Other scanners are standalone and even more highly portable. One such device, the DocuPen Mobile Scanner is not much bigger than a ballpoint pen. Card readers are more specialized scanning devices that can import name, address, phone number, and fax number fields automatically and enter them in a computer software program that manages contacts. These products are designed to recognize artwork and only perform OCR on actual textual information.

However, all of the above mentioned systems are deficient in their ability to serve as a platform to expedite remote transcription of financial information contained on individually unique forms. Automated recognition systems use means for making their assessment of numerical data based on image skew adjustment, noise removal, strictly determining which form type is recognized, optical character recognition, and manual verification guided by specialized software. Moreover, the accuracy of these products degrades considerably as the number of forms increases or forms cannot be recognized. In these cases, the transcription process would essentially require full data entry by a human operator. Even in the instance of a human performing the data entry manually, the overall results are currently limited by the reliability of that human individual.

None of the above mentioned systems are able to put confidence values on the assessments of recognition they determine or moreover automatically adjust its process to compensate in real-time for self assessment of transcription accuracy. Transcription systems do not currently have the means to automatically distribute workflow to workers based on their throughput and reward them based on their productivity. Moreover, none of these systems have means to provide rewards as a motivational tool to help all the transcription workers achieve-their best possible performance and reward those individuals for their own efforts with respect to their personal capacities.

SUMMARY

In order to optimally perform recordkeeping by minimizing user responsibilities, a portable multi-media automatic authenticating router (PMAAR) is incorporated in the system and methods which remove the need for a desktop, or laptop computer to handle information passing between remote storage devices and a user's personal devices. The PMAAR device is a smart information router. For example, while connected to a digital scanner, the information transmission to a preconfigured remote site, or even to local network storage, can be accomplished by a single push of a button.

Accordingly, a method for recordkeeping is provided which minimizes the burden of effort upon the user. The method includes a way to acquire document images of a transaction document. Once images are acquired, the method identifies a document type; based on the document type associates the document image with a data capture template; transmits the document image and the data capture template to a remote system; extracts record data from the document image based on the document type using either optical character recognition or remote data entry personnel; and then populates the data capture template with the record data. The data capture templates can be generated automatically based on parsing data within a recordkeeping system. The method can include means to verify integrity and accuracy of the record data before using it to populate the recordkeeping system.

In other features, an automated recordkeeping system is provided. The system includes data capture templates that are automatically defined by parsing of stored record information. The system also includes an automatic router device that captures an image of a transaction document and associates the document image with one of the data capture templates. In alternative embodiments, the image capture and data capture template association processes can take place on a disparate hardware. A document management server extracts record data from the document image using optical character recognition or based on input received from data entry personnel and populates the data capture template with the record data values. A recordkeeping server receives the populated data capture template and after verifying their integrity and accuracy, automatically updates the recordkeeping system with the record data from the data capture template of the extracted record data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
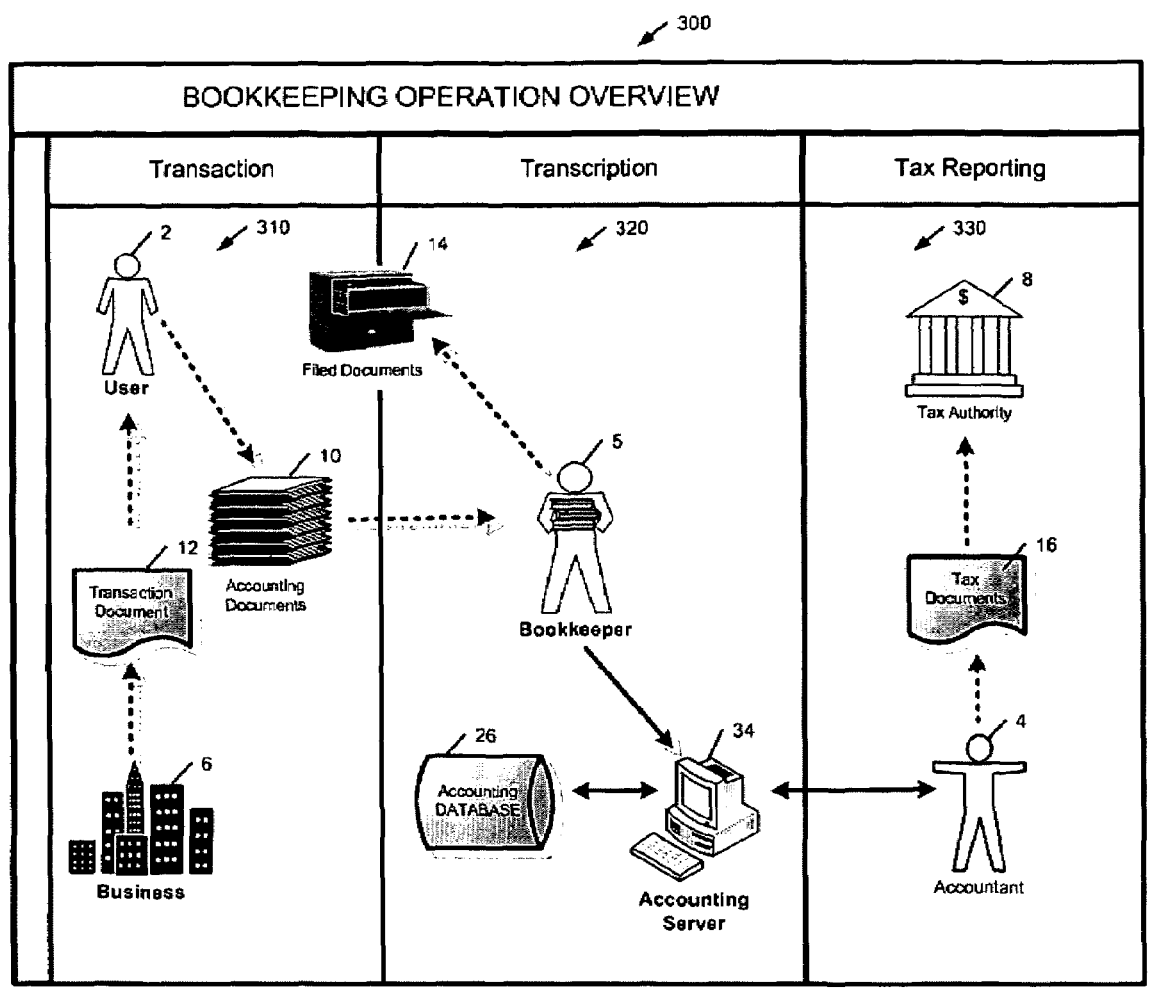
FIG. 1 shows a general overview of recordkeeping operations as practiced for accounting processes.
Figure 2:
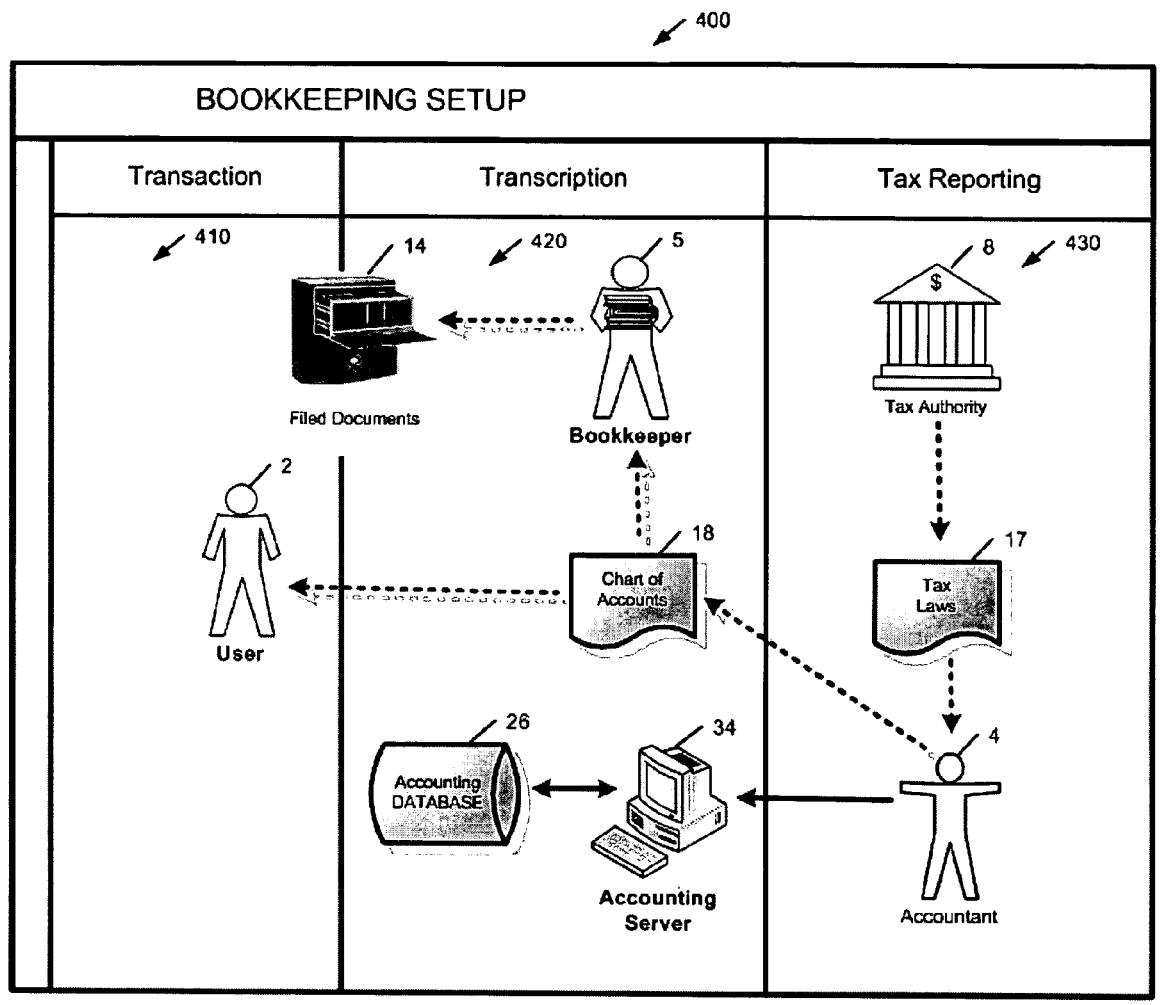
FIG. 2 shows a general overview of setup of recordkeeping as practiced for bookkeepers and accountants.

The following description is merely exemplary in nature and is not intended to limit the present disclosure, application, or uses. It should be understood that throughout the drawings, corresponding reference numerals indicate like or corresponding parts and features.

The following discussion assumes the reader is familiar with scanning hardware, OCR software, computer hardware, accounting and bookkeeping procedures, normal business practices for employee expense reimbursement and procedures for tax calculation and record keeping.

The present disclosure describes various embodiments of a method for simplified recordkeeping that comprise means for (1) document capture template creation—as provided by computer process to extract key fields from business documents; (2) document type identification and document capture—as provided by a special routing device; (3) document transcription—as provided by a combination of optical character recognition and human personnel; (4) transcription verification—as provided by adaptation of the method to expand the number of OCR engines or personnel to increase accuracy of the transcription process; and (5) record data storage—as provided by entry of the verified data being used to populate the capture templates. Various embodiments of simplified recordkeeping methods and systems include various implementations and combinations of the above described elements as will be described in more detail below.

Figure 3:
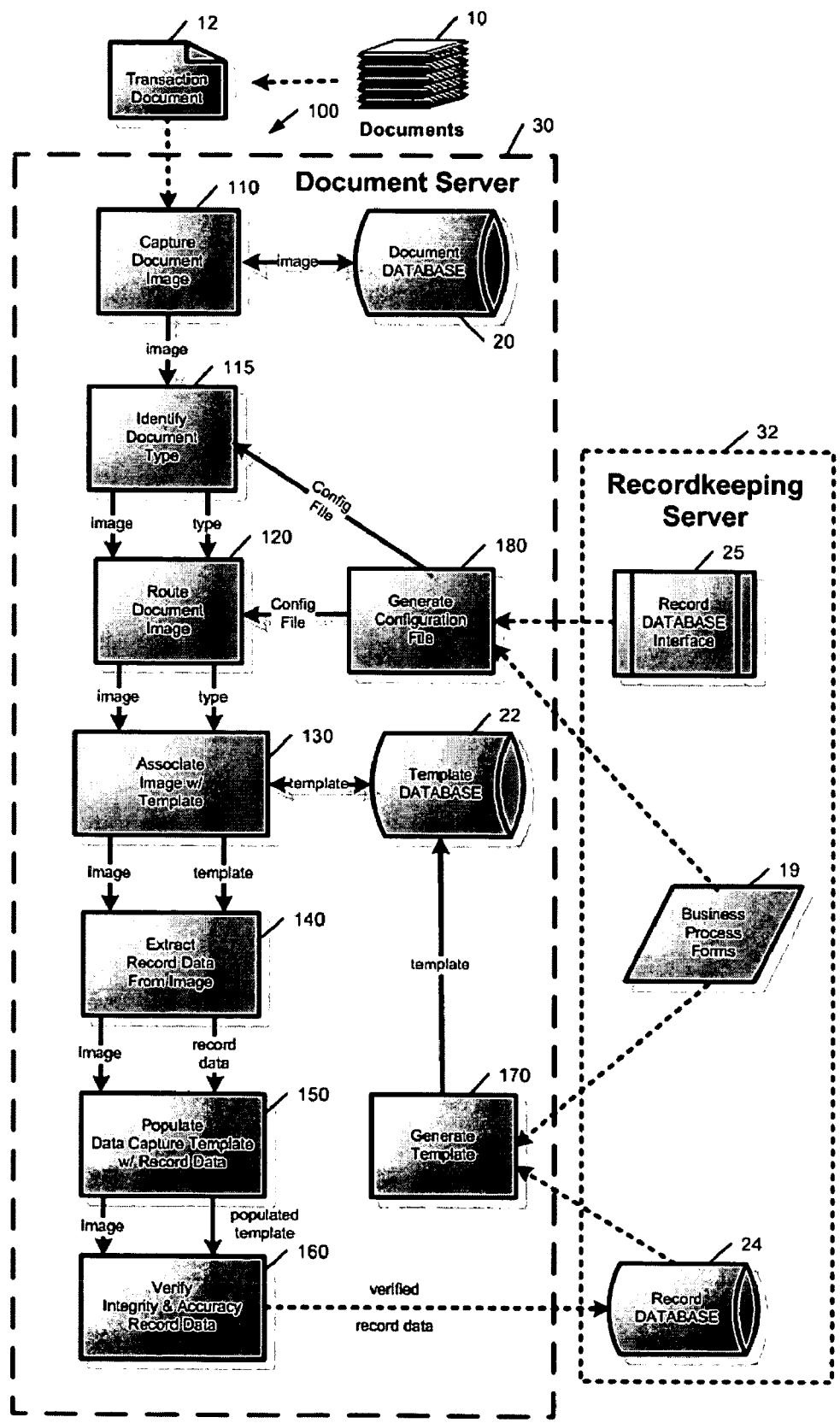
FIG. 3 is a dataflow diagram illustrating a simplified recordkeeping system.

FIG. 3 is a dataflow diagram illustrating a simplified recordkeeping system 100. In various embodiments a simplified recordkeeping system 100 performs accurate recordkeeping while minimizing efforts from the user. The system 100 can be implemented within a single computer or be distributed over a number of devices. Various software modules, data structures, and processes for performing simplified recordkeeping are encapsulated within the system 100. It is appreciated that the modules and data structures shown may be combined and/or further partitioned to similarly perform simplified recordkeeping.

For the sake of simplicity of description, the system in FIG. 3 is shown as consisting of two main computing locations, the document server 30 and the recordkeeping server 32. More particularly, various documents 10 provide a source for transaction documents 12. The transaction documents 12 are converted to digital form in a capture document image process 110 and stored in a document database 20. An identify document type 115 process analyzes the individual document images which have been acquired for recordkeeping by the system 100. The identify document type 115 determines classifying features such as a document type of each transaction documents 12 for input to a route document image process 120 which uses the configuration file information from the generate configuration file process 180 to add routing information to the document image and allow it to be sent to the proper location for further processing by among subsequent functions the associate image with template process 130. The associate image with template process 130 checks the template database 22 to select the appropriate template to use to determine what data needs to be extracted from the document 12. The extract record data from image process 140 uses the selected template with the document image to extract the desired record data. The extracted record data is then used for the populate data capture template with record data process 150. The performance of the extraction and population processes is checked within the verify integrity and accuracy of record data process 160 which by employ of an adaptive transcription and verification method can iterate the verification process until the necessary accuracy in the transcription is achieved. At this point, the verified record data is stored into the record database 24 located on the recordkeeping server 32.

As shown in FIG. 3, the business process forms 19 along with information from the record database 24 are used by the generate template process 170 to create templates for storage in the template database 22. An exemplary generate template process 170 is detailed in FIG. 6.

Also as shown in FIG. 3, the business process forms 19 and the record database interface can be combined by the generate configuration file process 180 with other information such as preferences entered directly by the user 2 in order to make the most applicable configuration file for use to most accurately identify the document type 115 and for most specific routing of the digitized data in 120.

While the simplified record keeping system 100 in FIG. 3 is shown as consisting of two computing locations, this partitioning is merely exemplary and the entire system could be implemented on either a single computer or more than two. For example, in another exemplary embodiment the capture 110, identification 115 and routing 120 processes are implemented on a smart router device 80.

As can be appreciated, the methods and systems of the simplified recordkeeping system are applicable to various record keeping systems including, but not limited to, medical record systems, accounting systems, and educational record systems. Although the methods and systems are applicable to various recordkeeping systems, for ease of the discussion, the remainder of the disclosure will be discussed in the context of an accounting system.

Figure 4:
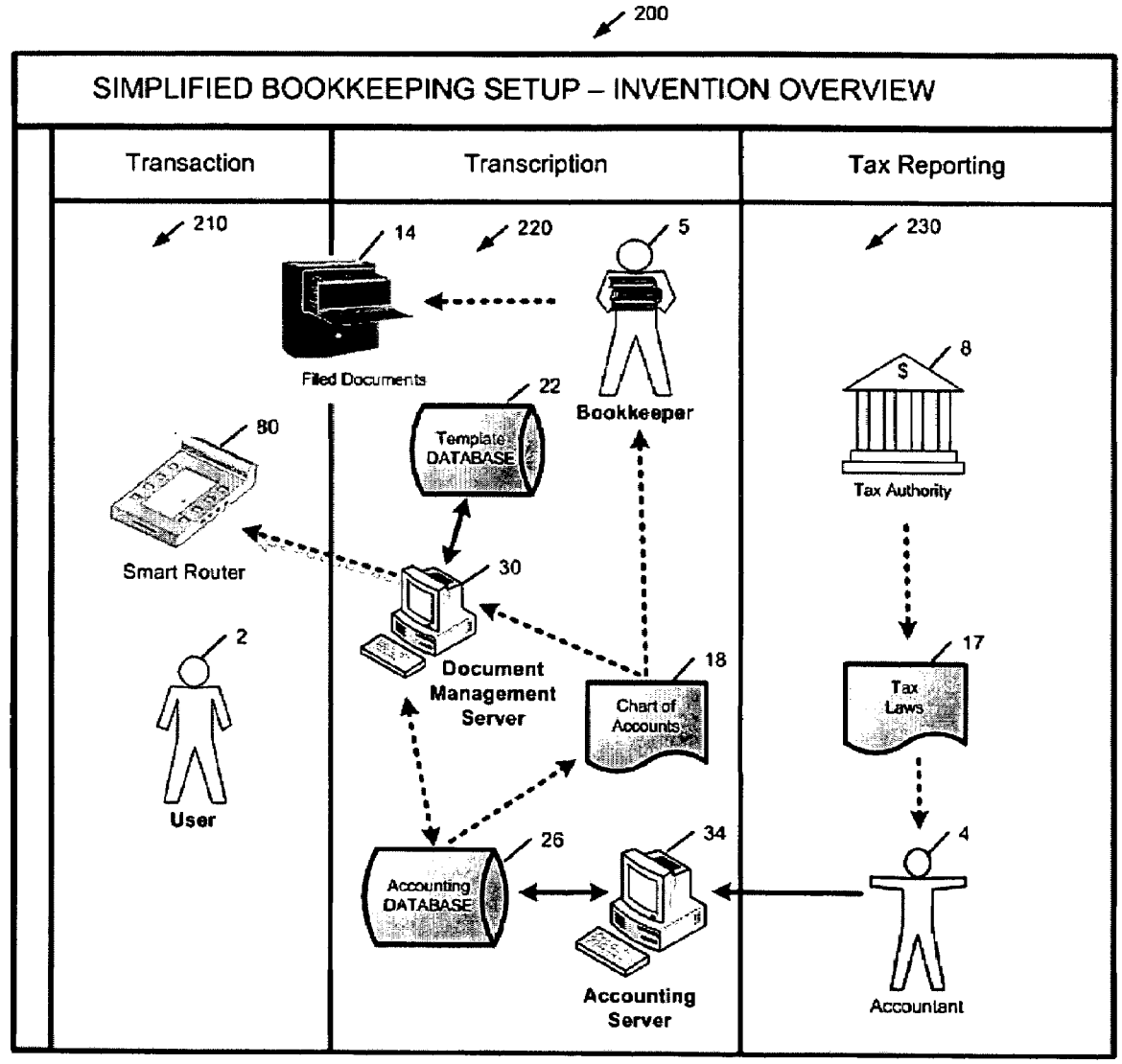
FIG. 4 is a system diagram illustrating an account chart and template generation process.

FIG. 4 shows a general overview of how setup is performed using an exemplary system which simplifies recordkeeping for bookkeepers and accountants. FIG. 4 illustrates that in the simplified recordkeeping process of this disclosure the accountant 4 creates the company accounting system on the accounting server 34 thereby generating the accounting database 26. The chart of accounts 18 are then created automatically. The chart of accounts 18 are communicated to the user 2 and the bookkeeper 5 for their understanding of the accounting system, and utility in any filing of documents into the filed documents 14.

However, one of the unique aspects of this exemplary setup procedure which can be used to achieve simplified bookkeeping is that the chart of accounts 18 is directly communicated to the document management server 30 which contains computer software which can convert this information along with other information extracted from the accounting database 26 to automatically generate the configuration files needed for the smart routing processes conducted for example on the smart router device 80. Likewise the chart of accounts 18, along with other information from the accounting database 26, are used with business process information to generate the template database 22. Business process information may be generated from the accounting server 34 or resides on the document management server 30. Further details of template database generation will be discussed with respect to FIG. 6 below. Upon completion of the setup procedure illustrated in FIG. 4, the smart router device 80, or some other computing system, for example, can support the simplified record keeping system operations depicted in FIG. 3.

Figure 5:
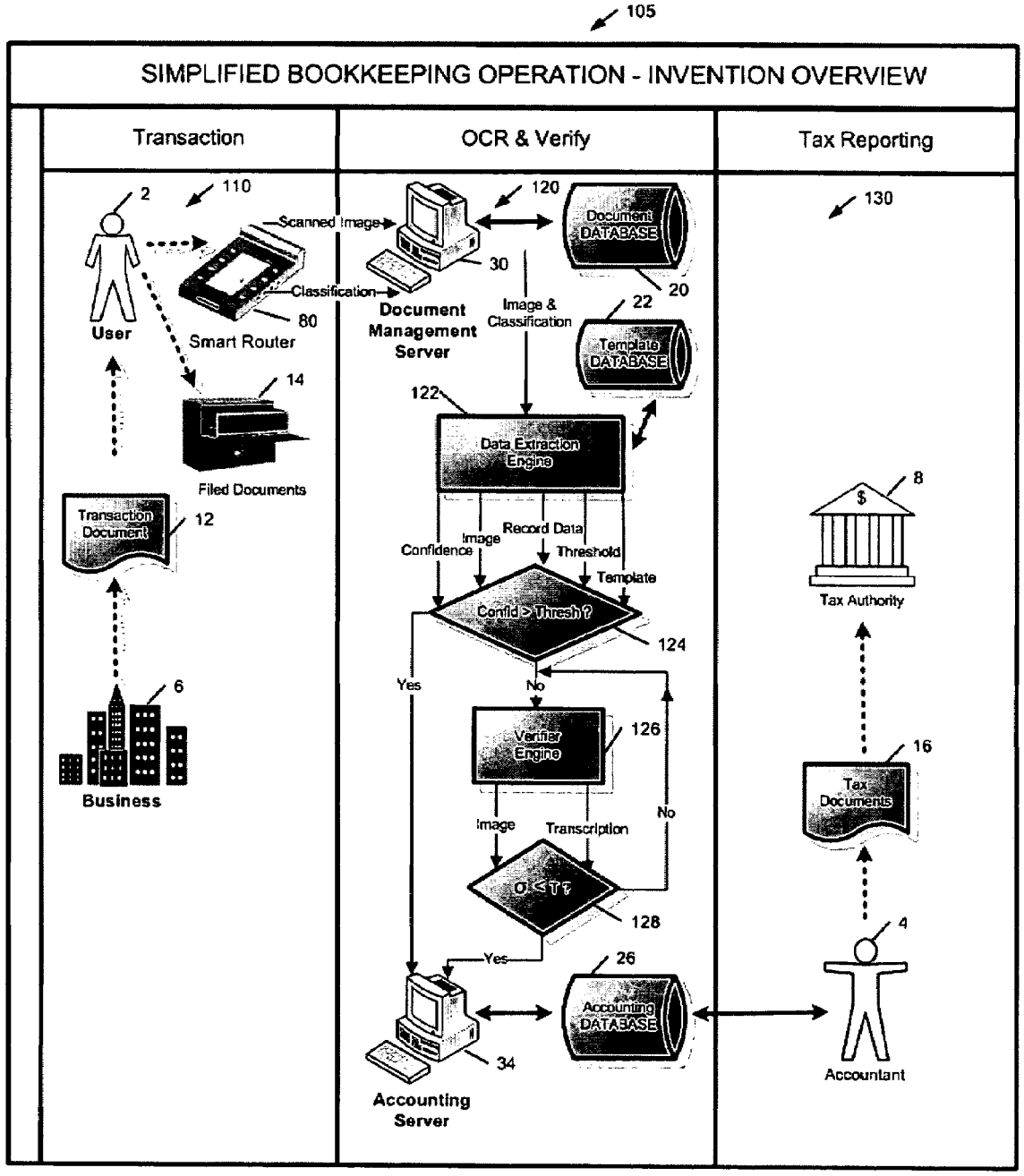
FIG. 5 is a system diagram illustrating a simplified recordkeeping process.

FIG. 5 is a system diagram illustrating a simplified recordkeeping process. In an exemplary embodiment of the system 105 for simplified recordkeeping, the user makes use of a smart routing device 80 as disclosed in U.S. Provisional Application No. 60/790,762. The description thereof is herein incorporated by reference. By employ of the PMAAR device 80 in the recordkeeping system, the effort required from the user 2 is minimized and the corporate bookkeeper is virtually eliminated. The user 2 participates in some activity with a business which results in the generation of a transaction document 12. As shown in FIG. 5, the user 2 rather than creating a pile of such documents for a bookkeeper, can use the PMAAR device 80 to scan the transaction document 12. The user 2 merely makes a minimum number of selections from the PMAAR display and thereby causes the scanned image of the document and the classification to be generated. When access to a network is available, the device 80 automatically uploads this information to an appropriate location in a document database 20 on a document management server 30.

A data extraction engine 122 uses classification information to assist in analyzing the image. The classification is used to query the template database in order to help determine the form template to be used in finding text fields to be analyzed. The data extraction engine 122 may use optical character recognition (OCR) among other computer techniques to generate recognition results. In addition to generating the character recognition results, the data extraction engine 122 calculates values for threshold and confidence of the recognition results. The decision process 124 uses these values to calculate whether the confidence is greater than the desired threshold value. If the confidence is greater than the desired threshold level then this is an indication that the data extraction engine 122 itself is able to perform accurate OCR and hence transcription. If not, then this is an indication that the OCR processes within the data extraction engine 122 are not able to transcribe the text with sufficiently high accuracy. In order to improve the recognition accuracy, a verifier engine 126 is used to perform enhanced transcription. The verifier engine 126 can be a program which transmits the digital image and template fields to capture information along with the data extraction engine 122 results to a plurality of human transcription personnel and different OCR programs. Once the verifier engine 126 has received a number of different values for the transcriptions results, it is able to calculate the variance in these values. If the variance is less than or equal to the desired predetermined threshold value (0 for 100% accuracy) then the consensus values from 128 are sent to the accounting server 34 for storage in the accounting database 26.

However, if the variance exceeds the threshold check of 128, then the verifier engine 126 secures more transcription results by sending the problem to additional transcription personnel or OCR programs. By employ of the simplified recordkeeping system the accounting database 26 contains the complete and accurate records and the accountant 4 can retrieve and use information from the accounting database 26 in order to generate tax documents 16 to fulfill requirements of a tax authority 8.

Figure 6:
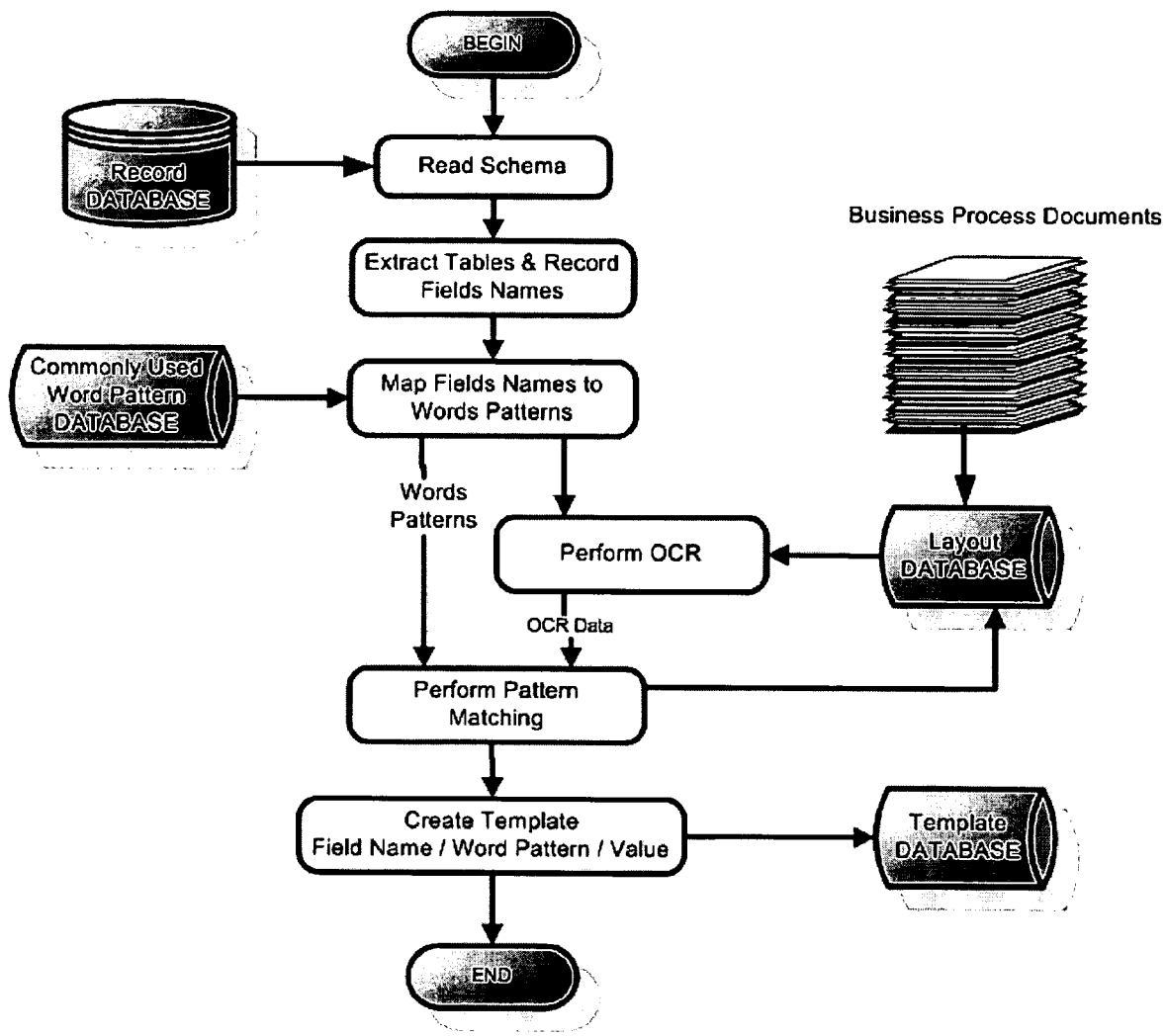
FIG. 6 is a flowchart illustrating a method of generating a template database.

FIG. 6 is a flowchart illustrating a method of generating a template database 600. The templates describe associations between the records stored in the database and incoming paper documents. In various embodiments, each template is a data structure containing data elements and data fields. Every business process uses some kind of electronic or paper document to handle various business transactions shown as business process forms 19 which are aggregated in layout database 21. For example, a buying process involves purchase orders and invoices, whereas a human resources hiring process may include use of an employee profile capture document. These document data fields are later populated into various record keeping database tables. These data documents may not contain a one to one relationship between tables and these data documents. It is possible that a single document datum is proliferated among many table entities. In order to achieve this association, the system analyzes the schema defined in the database tables. The creation of the template database 22 begins with the analysis of the record database 24 in a read schema process 610. The analysis results in various field names used by various tables during the extract tables and record fields names process 620. Once these fields are identified, they are mapped against human readable patterns in 630. The commonly used word pattern database 25 contains phrases and terminology frequently found in various business process forms 19. For example, an invoice number could be represented in a database table as 'inv_id', however when captured appears on various documents as 'invoice:', 'inv#' or 'invoice no' on an invoice form. These patterns are used for the pattern recognition process 650 which conducted on optically recognized form's character values 640 to find the location of these fields and their values on the business process form. The found values are saved along with the layout templates and fields' names, words patterns and values triplets are created for each document type in 660.

Figure 7:
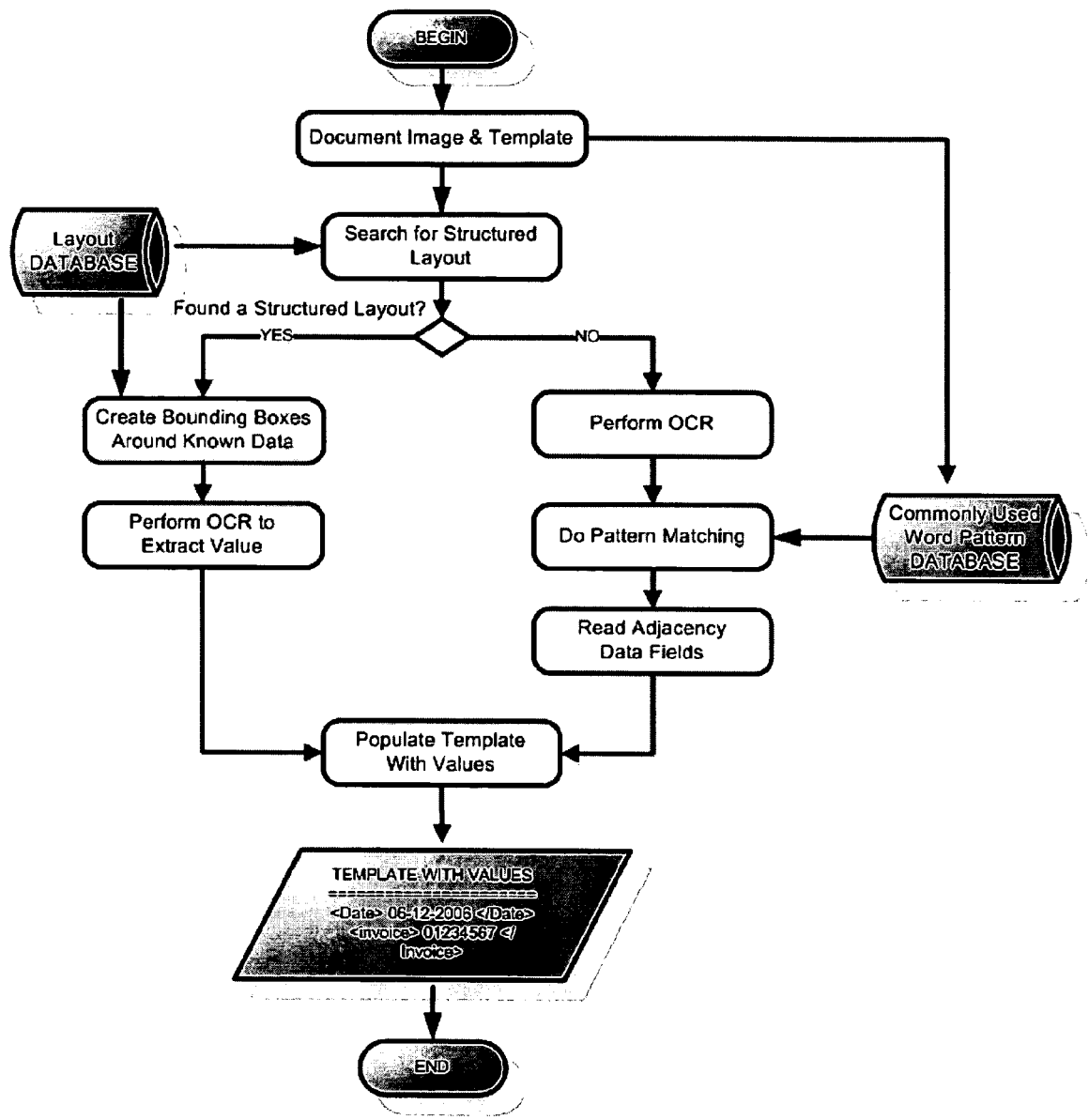
FIG. 7 is a process flow diagram illustrating a method of extracting record data and populating a template database.

FIG. 7 is a process flow diagram illustrating a method of extracting record data and populating a template database 700. The method can be used to map data values on a business process document to the empty fields of the record templates, later to be inserted in the business record database. FIG. 7 illustrates an exemplary methodology employed by the extract record data from image process 140 and the populate data capture template with record data process 150 of FIG. 3. The exemplary method in FIG. 7 deals with two types of documents among others: a structured document type, and an unstructured document type. A structured document type is a document that has a predetermined format. An unstructured document is a document type that has a continuously changing format. For example, the federal government W-4 form represents a structured type. Where as, various invoices from numerous vendors represent examples of an unstructured document type.

In both cases, once the document type is identified 710, either automatically or semi-automatically, the document image is used to search for a structured layout in 720 against the template database 25 using image template matching techniques. If a match is found, the document is marked as a structured document type and various bounding boxes representing record field values are queried in 730. An OCR process can then be carried out to convert each identified bounding box into a character string in 740. The document template is then populated with these OCR values in the populate template with values process 780. In an alternate scenario, the template may include OCR confidence, image quality, and document skew and noise correction factors to aid human intervention for poorly recognized filed values.

In an alternate embodiment, if the search does not result in finding any matching template to the scanned document, it is marked as an unstructured document and a template is created. In this case, after document image enhancements and correction steps, the document is converted into text using an OCR process at 750. Since the document template type is known in advance, the commonly used record field names can be passed to the OCR process 750 as additional vocabulary words. Subsequently, the OCR data is further passed to a pattern matching module 760 that looks for various commonly used names that describe various record field values in a document. This can be accomplished by a simple string matching, state driven search using Hidden Markov Model, Neural Networks, or any statistical pattern recognition technique. Once these commonly used words are located, a proximity area around the word is examined for possible data values in read adjacency data fields process 770. Any ambiguity can result in a poor confidence number which flags the proposed value for future human intervention for data value correction. Once all the empty values are searched in the given document, the record template is filled in with these values.

Figure 8:
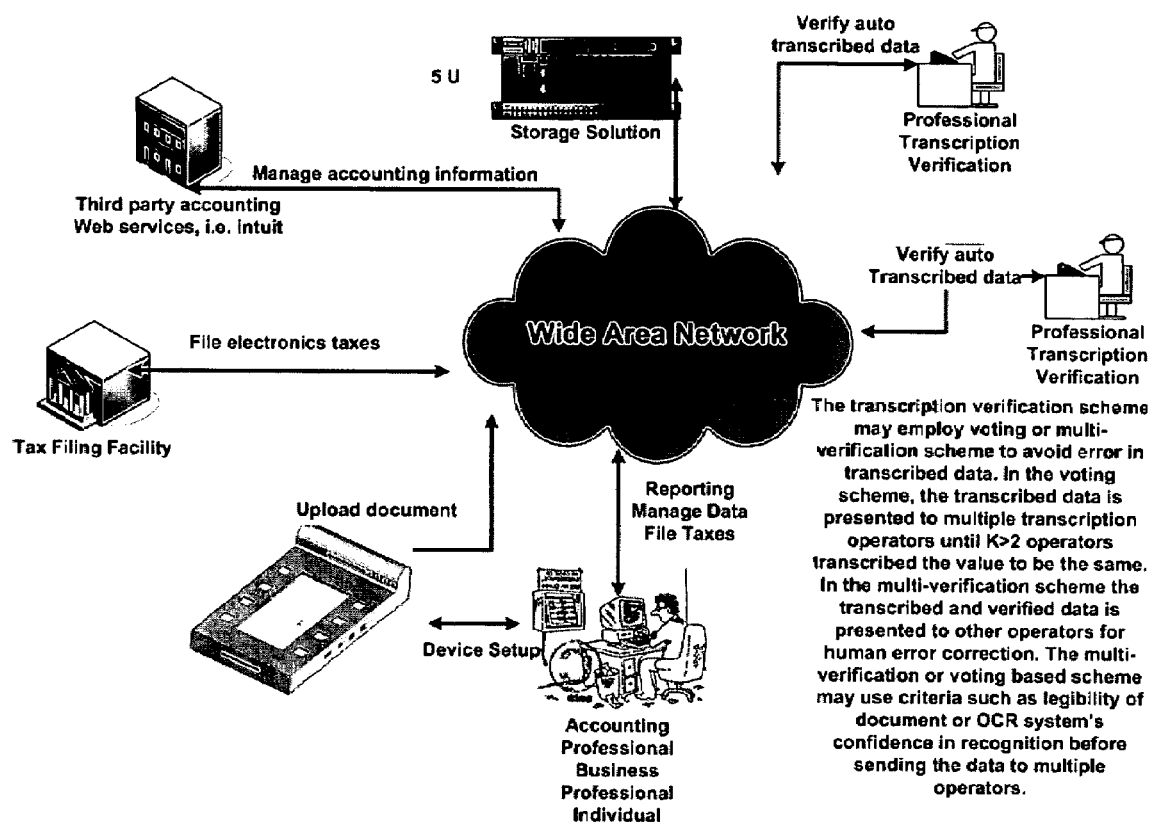
FIG. 8 is a high level system diagram illustrating an exemplary automatic authenticating router device integrated within a simplified accounting process environment.

FIG. 8 shows an example accounting record management and bookkeeping business process automation using the proposed method. In this business process automation, the user first configures the device for the accounting application. The underlying record database in this case would be an accounting system, which may reside on a remote machine, the user's personal computer or the user's personal bookkeeper's machine. In either case, the device setup programs the unit for user specific chart of accounts and vendor information. If no such information is available, a default chart of account database can be provided with the device that follows a governing body's preferred classification schema. Once programmed, the PMMR device functions independently and uploads all of its data using a broadband or dial-up service to the document management service provider. Users, in this preferred environment, have programmed configurations for pre-classification of various incoming documents. Thus, the system accurately associates a specific record template and can perform data extraction using OCR.

In an alternate scenario, the system can also acquire classification data based on stored layout templates and previously scanned and classified documents. To guarantee the total data integrity and accuracy, the service provider can employ an additional verification process. Such processes can be implemented using a variety of configurations. FIG. 8 illustrates use of a voting scheme for verifying the integrity and accuracy of transcribed accounting record data. In an alternate scenario, the voting scheme can also use risk based voting requirements, where risk is identified using quality of image and other significant pre-processing steps used by OCR and its confidence measures. The higher the risk, the document transcription needs and acquires more votes to be accurate. Once fully extracted, all the accounting data is pushed back to the user's accounting database. This can be achieved by importing the record data or sending and updating records over a communication link. Since the underlying example deals with accounting, its use for tax filing and auditing is also demonstrated by inclusion of the government agency in the process.

Figure 9:
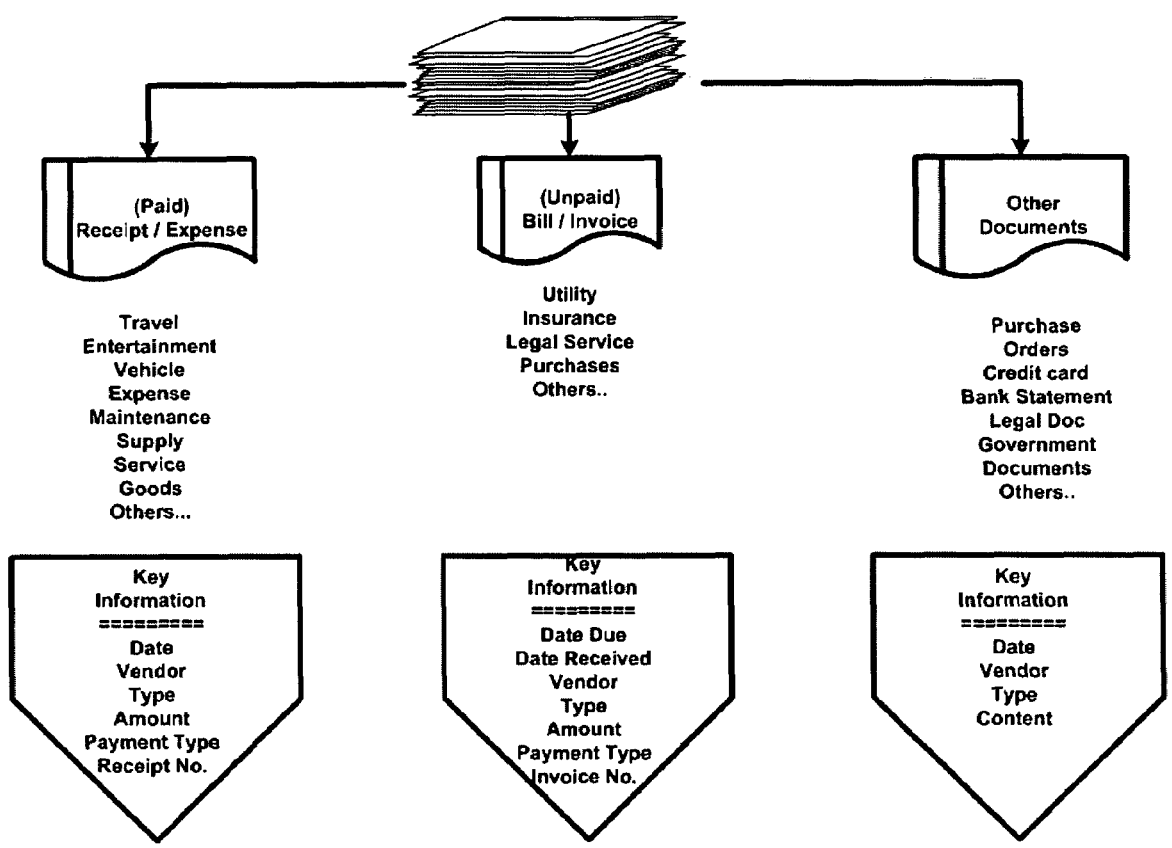
FIG. 9 shows exemplary documents related to recordkeeping process for accounting. Each document type is further elaborated with key information that can be extracted into the template database for use in various business transactions.

FIG. 9 shows examples of the various type of accounting transactions that an individual or small business may encounter in daily operations. The left column of the figure shows a plurality of options from which the bookkeeper could select the expense type, and payment type if more than just cash expenses are to be entered into the accounting system. The expense type and payment method and potentially any related account may be selected from the permissible and preferred alternatives shown in the middle row such as travel, entertainment, vehicle, and maintenance among others. Furthermore, if desired the additional capabilities could be provided to assist the user in entering other information at this point. However, it is the purpose of this disclosure to require the minimum of interaction with the user and therefore as shown in FIG. 9 the simplified recordkeeping system extracts from the document the date of transaction, expense amount, and bill or invoice number among others. The required fields necessary for proper storage of expenses are for example: 1) expense type; 2) expense amount; 3) date & time; 4) expense id; 5) vendor name; 6) receipt number; and 7) payment type.

The middle column of FIG. 9 shows a plurality of options from which the user could select the invoice/bill type, and the required fields necessary for proper storage of invoices/bills are for example: 1) account type; 2) amount; 3) date issued; 4) date due; 5) invoice number; 5) vendor name. The right column of FIG. 9 shows that for other financial documents it is possible for the system to allow classification of the document type for example, purchase order, credit card or bank statement or even a legal document. The key information to be extracted in this case would be limited to 1) date; 2) vendor name; 3) type; and then 4) the actual content.

Figure 10:
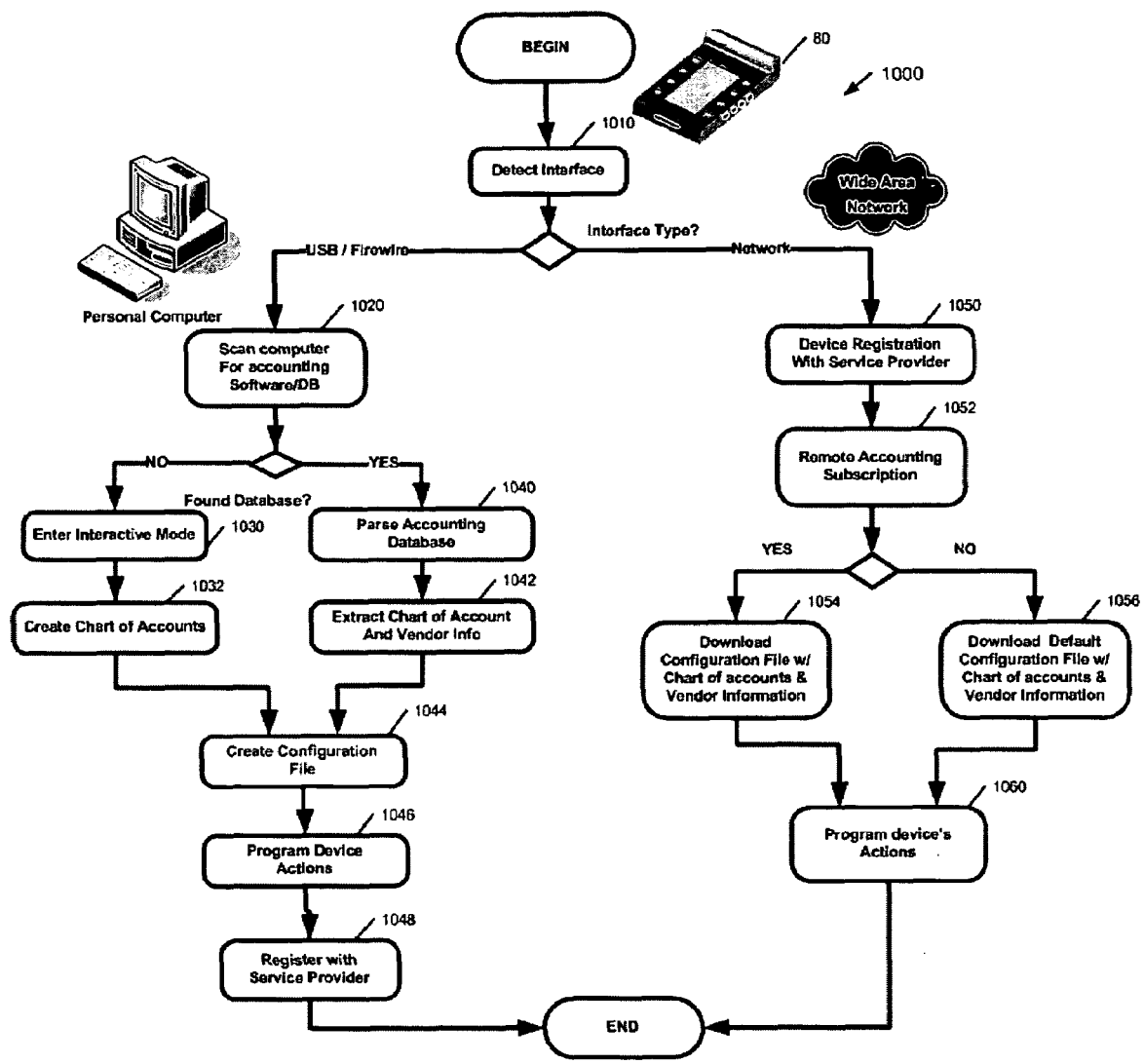
FIG. 10 is a process flow diagram illustrating a method of setup for an automatic authenticating router device as performed within the simplified recordkeeping system.

FIG. 10 shows steps that the simplified recordkeeping system follows to facilitate setup of the router device 80 to perform for example financial document management. Since the setup process constitutes creation of routing and classification information within the configuration file, the file creation and its upload to the device can be achieved in numerous ways. The router device 80 needs three sets of information to configure its actions—(1) the authentication information, (2) the document classification information and (3) the document dispositioning information. Although (1) and (3) can be configured as elaborately as necessary, FIG. 10 illustrates by example the process for two major means of system setup which are (1) locally setup by connection with the user's personal computer or alternatively (2) setup in conjunction with a remote service provider. However, in a complex scenario a single document type may associate itself with multiple accounts—for example in a complex accounting system various expense types may get charged to different business accounts for billing. Therefore additional classification is needed to uniquely associate a single document type to a specific record. Such capabilities are also programmed via action buttons to disambiguate the document type association for a complex scenario.

In this embodiment, upon receiving the routing device 80, the user connects it to a local computer or a remote server via embedded dialup modem or networking interface. The routing device 80 detects a connection interface 1010. The left main branch of FIG. 10 shows the instance of the routing device being directly connected with a personal computer, wherein the user might start the setup software or it could be programmed to start automatically. Under this scenario, the setup software is designed to auto search any local accounting databases for various accounting solutions 1020, including Quickbooks, Peachtree, Quicken, and Microsoft Money among others. If such a software solution or financial database is found, a parser process is launched to glean information from the pertaining database 1040. The parser will then work to extract the chart of account information and as shown in FIG. 10, in some cases the extract chart of account and vendor info process 1042, may also extract vendor information from the database, which may be utilized to associate financial documents with various recurring merchants. Upon parsing the user's accounting database, a process is run to create the configuration file 1044 which contains routing and classification information to upload to the device 80. The configuration file is then sent to the routing device 80 to configure its action buttons which associate accounting or financial documents to various chart of accounts with few simple touches in the program device actions process 1046. The device 80 can keep the list of favorites, or frequently used classes, at the top hierarchy level to achieve a single touch bookkeeping behavior. If no accounting database is found on the user's personal computer, the computer or device can enter interactive mode 1030 whereby the user may be presented questions or options to gain enough routing information. When the options are selected the create chart of accounts process 1032 creates a file to upload to the routing device 80.

In an alternative scenario, if no configuration information file is found, the setup method can assist in creating a chart of accounts by asking the user a series of questions.

The right main branch of FIG. 10 shows the instance of the routing device 80 being directly connected with a remote service provider over a wide area network. Under the latter scenario, the special device hardware or software to uniquely identify the router, and as disclosed in U.S. Provisional Application No. 60/790,762, is used for authenticating the user to the remote site. In this variation, the user first performs device registration with the service provider 1050 by means of web or calling customer service at the provider and activates its services. If the accounting records management service 1052 is available from the service provider, the device analyzes the database for recorded chart of accounts and vendor information in the accounting database. Optionally, it is possible to store the customized or standard configuration file in a user profile. A search through the user profile finds the configuration file which includes the chart of accounts along with vendor information. If the configuration file is found, it is uploaded to the device 80. If no such file is found, a default configuration file is uploaded to the device to setup the reconfigurable action buttons.

In another exemplary method, the configuration file, if present, can also be uploaded via external memory interfaces of the routing device. In yet a different usage scenario, the setup of chart of account classification information is set by the service provider.

Figure 11:
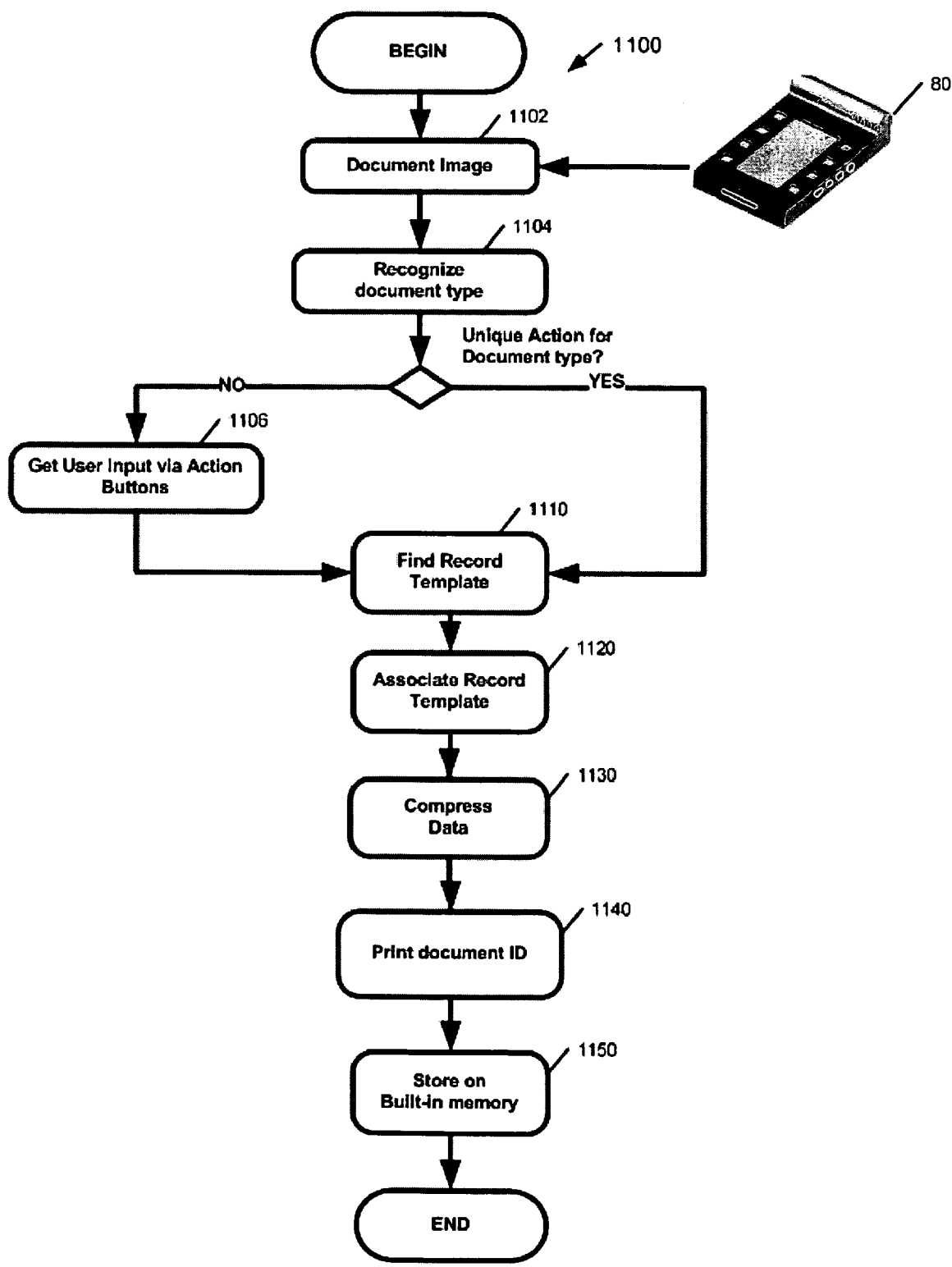
FIG. 11 is a process flow diagram illustrating a method of capturing document data by an automatic authenticating router device as performed within the simplified recordkeeping system.

FIG. 11 is a process flow diagram illustrating an exemplary method of capturing document data by usage of a router device 80 as performed within the simplified recordkeeping system. This flow diagram is essentially a detailed flowchart of the process steps identify document type 120 and associate image with template 130 as illustrated in FIG. 3. As an accounting document is received, depending on the mode of operation, manual or auto, the document is scanned automatically or with a push of a button. Upon scanning completion, the device 80 can execute the recognize document type process 1104. Alternatively, the recognize document type can take place outside the PMAAR device, either on user computer or remote server. If the type is not recognized, by employ of a single touch scenario, the user may perform manual document type classification using the device's user interface as illustrated via action buttons in 1106. In an alternative embodiment, if additional classification hierarchy is present, as in for example a receipt document type, the user may have to perform additional actions to select additional account or type information. The full classification data gets associated with the scanned document and the find record template process 1110 is used to search the template database to find the corresponding template to the file type determined. The associate record template process 1120 combines the template with the scanned image and the document type and other classification information. The compress data process 1130 compresses and encrypts the combined image data and the associated classification data to achieve greater security and network performance. Alternatively before or after file compression by using an embedded printer, the device can run a print document ID process 1140 which prints a unique identification on the scanned document for future indexing and auditing. The store on built-in memory process 1150 stores the compressed and identified file on the non-volatile temporary memory storage. At this time, the device is ready to flush its memory to the remote location. If the connection is established to the server, the device moves into the transmit mode, there by clearing the buffered data and freeing the device memory.

In an alternate embodiment, document scanning and classification are configured and triggered using frequently used actions buttons or short cuts to achieve a single touch scan and assignment of chart of accounts. For example, the hierarchical chart of account system may have classified account for a "GAS Expense" as, 1001 Expense→1001.1 Vehicle Expense→1001.1.1 Gas Expense. Since Gas expense is at the leaf node, which may be selected by user a number of times as account classification action, the system can program it as a frequently used short cut for single touch classification. In this case, the classification hierarchy is skipped by simply touching and classifying the document with a single touch.

Figure 12:
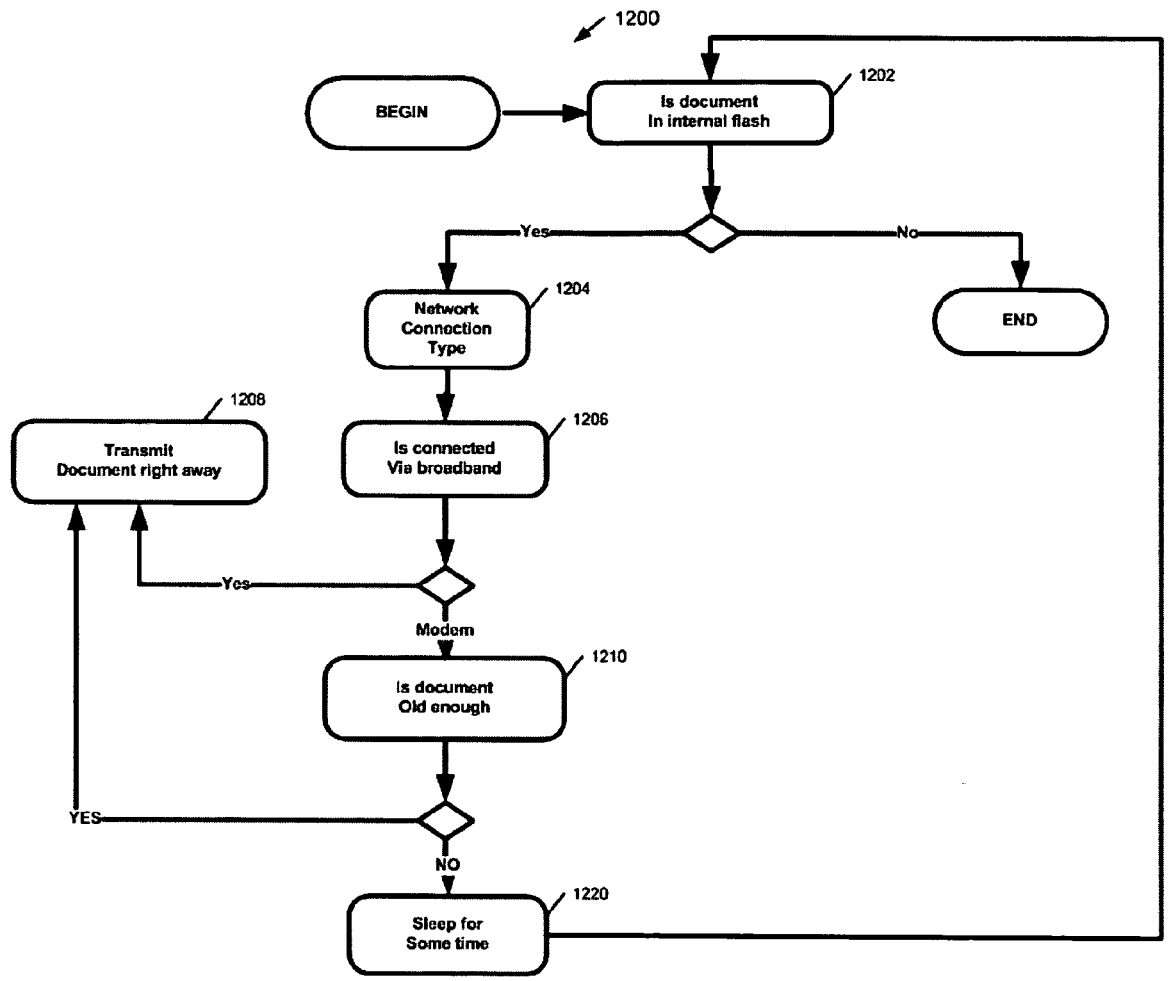
FIG. 12 is a process flow diagram illustrating a method of transmitting stored digital data by an automatic authenticating router device as performed within the simplified recordkeeping system.

FIG. 12 is a process flow diagram illustrating a method of transmitting stored digital data by a router device as performed within the simplified recordkeeping system. Although, this disclosure is not dependent on a physical networking layer, among several alternatives there are two main scenarios of data transmission. The first is considered a slow network connection such as the one found via dial up modem and the second is via high speed networking. The router device continuously performs a process which checks for availability of data in buffered flash memory 1202. If there is no data to be transmitted, the device ends the upload data process until its next timer event for data check triggers. If data is found on its internal flash or memory to be flushed to the remote server, the router device 80 checks for availability of either high speed or low speed network connections in the network connection type process 1204. If a high speed connection is found then the connect via broadband process 1206 establishes the communications and the stored data is immediately transmitted to the remote server 1208. In the case that only a slow connection such as a modem for example is detected, the router device may run processes which check for two parameters before establishing a link and starting a transmit process—(1) how old the document is 1210 and (2) is device memory close to be full. In either case, the device initiates the dialup and establishes the connection to the remote site and the document is transmitted. The data transmission is a periodic activity, which is managed by timer and intelligent algorithms that must balance device scan activities, memory usage and aging of documents in memory. At the time of every new document scan, the device may start immediate transmission or set a timer for the next transmit 1200.

Figure 13:
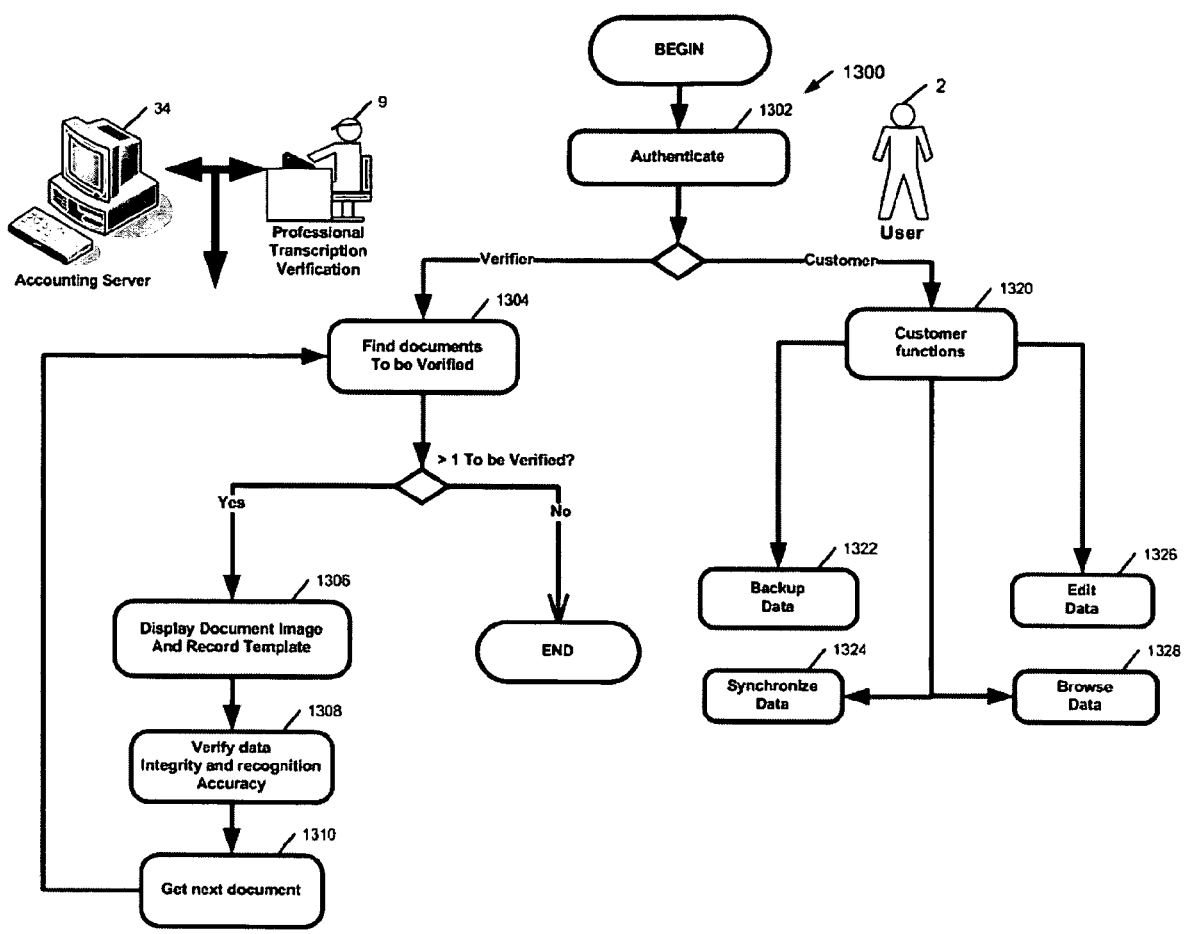
FIG. 13 is a process flow diagram illustrating a method of executing the verification and correction of transcription data processes as performed by the simplified recordkeeping system.

FIG. 13 is a process flow diagram illustrating a method of executing the verify and correct transcription data process 1300 as performed by the simplified recordkeeping system.

Once the recordkeeping documents are acquired as in FIG. 11 and uploaded as in FIG. 12 the remote recordkeeping server has many documents and associated templates which a user may wish to perform a multitude of functions. Because of the value of this information an authentication process 1302 is used to establish the identity of the user. Once established, in an exemplary embodiment, the user 2 can have access to the personal data via internet application or proprietary custom application interface. Such user access can give choice of a number of customer functions 1320. Selection of the appropriate item from the menu will allow the user to perform backup data process 1322, synchronize data process 1324, edit data process 1326, or a browse data process 1328 among others including but not limited to generating comprehensive reports, exporting data for use in an external software application, or organizing the files and records.

Alternatively, a professional transcription worker 9 may be employed to verify or transcribe the uploaded documents and the worker is given the ability to authenticate and gain limited access to the recordkeeping data. Running on the remote recordkeeping server is find documents to be verified process 1304. In an exemplary embodiment when the transcription professional 9 performs a login and is authenticated, a display document image and record template process 1306 presents the document or document section needing transcription to the worker 9. Transcribed values from the worker 9 are added to any of the prior existing values for the template data items. A verify data integrity and recognition accuracy process 1308 uses statistical analysis to select one of the acquired values and determine whether the variance between the transcribed field is greater than the predetermined threshold of accuracy (0 for 100% accuracy). If sufficient confidence in the value found has been achieved with the latest addition to the transcription then this document is removed from the list of documents to be verified and the worker 9 is presented with the next document which needs transcription.

By virtue of a statistical process being able to adapt to a changing threshold the quality of the transcription can be constant and yet make optimal usage of the labor pool of workers. Documents do not need to be sent to a fixed number of workers although in one embodiment this number may be set to say that agreement must be found between a fixed number of workers or a fixed number of workers. For example, three workers must transcribe the document no matter what their agreement in results. The value of the present disclosure is that the number of transcribers necessary to achieve the desired level of confidence is optimally achieved by the software of the system calculating an operational value for the confidence level and routing the document in question to additional transcriber workers 9 until the confidence exceeds or equals the desired value. Another method to achieve a desired level of accuracy is to implement a voting scheme whereby there are a minimum number of transcribers and more are added to the vote until a majority of voting transcribers have achieved the desired level of agreement. If the values do not converge to a result quickly enough the voting software can employ some mechanism to break the stalemate or lack of decision.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method of record keeping, comprising:
using optical scanner to capture a document image of a transaction document;
using a computer to identify a document type of the transaction document;
using a computer to associate the document image with a data capture template based on the document type;
using a computer to transmit the document image and the data capture template to a remote system that exposes the document image and data capture template to a plurality of distributed transcription verification professionals who cast votes that are processed by the remote system to form a consensus to extract information from the document image;
using a computer to extract record data from the document image based on the document type and based on information extracted by the plurality of transcription verification professionals; and
using a computer to populate the data capture template with the record data.

2. The method of claim 1 further comprising defining a plurality of data capture templates based on a recordkeeping system.

3. The method of claim 2 wherein the data capture template is a data structure containing a plurality of data elements.

4. The method of claim 2 further comprising parsing the recordkeeping system for account information and wherein the defining a plurality of data capture templates is based on the account information parsed from the recordkeeping system.

5. The method of claim 1 wherein the extracting record data is based on optical character recognition.

6. The method of claim 1 wherein the extracting record data is performed by remote data entry personnel.

7. The method of claim 1 further comprising:
verifying at least one of integrity and accuracy of the record data; and
transmitting the document image and the data capture template populated with the record data to a recordkeeping system.

8. The method of claim 7 wherein the verifying comprises verifying at least one of integrity and accuracy of the record data based on a voting scheme and further comprising iteratively performing the verifying until a confidence value is achieved.

9. The method of claim 8 wherein the verifying is performed by remote data entry personnel and wherein the method further comprises rewarding remote data entry personnel based on a number of verification iterations.

10. The method of claim 7 further comprising automatically updating the recordkeeping system with the record data from the data capture template.

11. The method of claim 1 further comprising:
providing an automatic router device wherein the automatic router device performs the steps of capturing, automatically identifying, and transmitting; and
providing a remote system wherein the remote system performs the steps of extracting and populating.

12. The method of claim 2 wherein the recordkeeping system is an accounting system.

13. The method of claim 1 wherein the step of extracting record data from the document image is further based on the data capture template.

14. The method of claim 1 wherein the step of extracting record data from the document image is further based on use of multiple OCR engines.

* * * * *